Dec. 10, 1968  G. E. HALL  3,414,979
TWIST DRILL POINT GAUGE
Filed Feb. 2, 1966  2 Sheets-Sheet 1

George E. Hall
INVENTOR.

Dec. 10, 1968

G. E. HALL 3,414,979

TWIST DRILL POINT GAUGE

Filed Feb. 2, 1966

George E. Hall
INVENTOR.

BY *Clarence A. O'Brien*
and *Harvey B. Jacobson*
Attorneys

United States Patent Office 3,414,979
Patented Dec. 10, 1968

3,414,979
TWIST DRILL POINT GAUGE
George E. Hall, 3039 Alcott Ave., Flint, Mich. 48506
Filed Feb. 2, 1966, Ser. No. 524,572
10 Claims. (Cl. 33—201)

ABSTRACT OF THE DISCLOSURE

A gauge including a workpiece cradling assembly for adjustably supporting twist drills for various diameters concentric with a center axis defined by the gauge and for longitudinal shifting of the supported drill along the center axis to advance the conical tip of the drill into engagement with gauging indicators, for gauging concentricity of the conical tip of the drill, the inclination of the cutting edges of the tip and the approximate oversized bore which will be cut by the drill.

This invention relates to a novel and useful twist drill point gauge and more specifically to a gauge for checking subland drills.

In addition to being specifically adapted to check subland drills, the gauge of the instant invention will also check conventional drills. Further, the gauge of the instant invention comprises an improvement over the gauge disclosed in my prior U.S. Patent No. 2,608,767, dated Sept. 2, 1952.

The main object of this invention is to provide a gauge for checking the conicity of the tip of a drill as well as the concentricity of the tip of a subland drill.

Another object of this invention is to provide a gauge operable to determine the angle of a machined or ground conical tip on a drill.

Yet another object of this invention is to provide a gauge including improved means by which drills of various sizes may be properly supported for gauging by the gauge.

A still further object of this invention is to provide a gauge in accordance with the preceding objects operable to determine the concentricity of major and minor lands of subland drills.

A final object of this invention to be specifically enumerated herein is to provide a gauge in accordance with the preceding objects which will conform to conventional forms of manufacture, be of simple construction and easy to use so as to provide a device that will be economically feasible, long lasting and relatively trouble free in operation.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

FIGURE 4 is an enlarged fragmentary vertical sectional view taken substantially upon the plane indicated by section line 4—4 of FIGURE 1;

FIGURE 5 is a fragmentary horizontal sectional view taken substantially upon the plane indicated by the section line 5—5 of FIGURE 4;

FIGURE 7 is a perspective view of one of the relatively movable gauging abutment members of the sub-land gauge.

Figure 1:
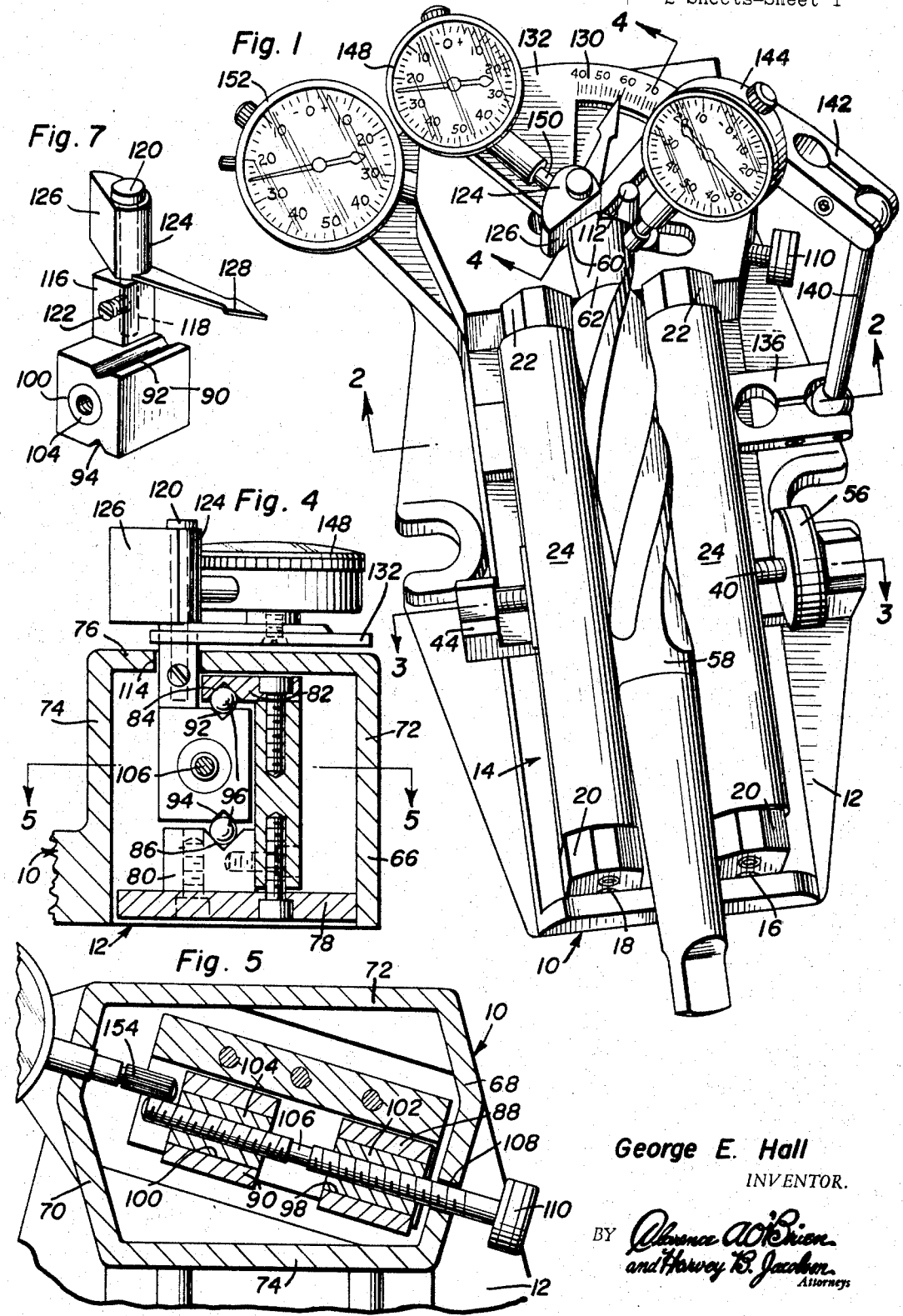
FIGURE 1 is a perspective view of the gauge of the instant invention shown supporting a sub-land drill in position to be gauged.

Referring now more specifically to the drawings, the numeral 10 generally designates the gauge of the instant invention which includes a base 12 from which a cradle assembly generally referred to by the reference numeral 14 is supported.

Figure 6:
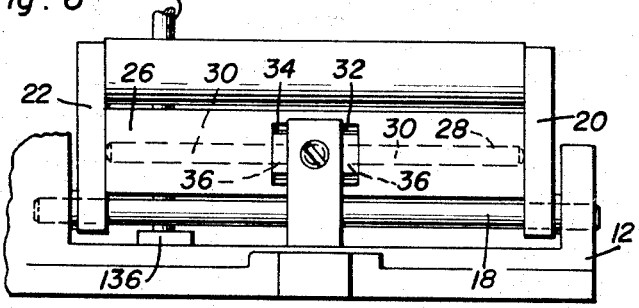
FIGURE 6 is a fragmentary side elevational view of the drill supporting portion of the gauge.

The cradle assembly 14 includes a pair of generally parallel support shafts 16 and 18 which are supported from the base 12 in fixed position. The shafts 16 and 18 each rotatably support a pair of plate-like support arms 20 and 22 which have one set of corresponding ends rotatably journaled on the shafts 16 and 18 and the other set of ends of each pair of support arms 20 and 22 rotatably journals the opposite end portions of a cylindrical support member 24 extending therebetween. The support members 24 are spaced from the shafts 16 and 18 as shown to best advantage in FIGURES 2 and 3 of the drawings and a pair of elongated block-like supports 26 are disposed between each support member 24 and the corresponding shaft and extend between the corresponding support arms 20 and 22. The supports 26 each have a longitudinal bore 28 formed therethrough, see FIGURE 6, and a pair of support pins 30 are disposed in opposite ends of each bore 28 and have their remote ends disposed in abutting engagement with the corresponding pair of support arms 20 and 22. Further, it may also be seen from FIGURE 6 of the drawings, that each of the blocks 26 has a centrally disposed transversely extending opening 32 formed therethrough in which an elongated bearing block 34 is disposed. Each opening 32 is communicated with the corresponding bore 28 and each of the bearing blocks 34 has a pair of opposite end blind bores 36 formed therein in which the adjacent ends of the corresponding support pins 30 are rotatably received.

The bearing blocks 34 have oppositely threaded bores 38 formed therethrough in which the oppositely threaded end portions of a screw shaft 40 are threadedly engaged. A generally U-shaped screw shaft supporting bracket 41 including a pair of upstanding leg portions 42 and 44 interconnected at their lower ends by means of a bight portion 46 which is secured to the base 12 in any convenient manner such as by fasteners 48 is provided and the leg portion 44 includes a seat 47 in which a spherical bearing element 49 is seated. In addition, the leg portion 42 has a transverse threaded bore 50 formed therethrough and a bearing seat-defining setscrew 52 is threadedly engaged in the bore 50, the latter opening at one end toward the seat 47. A second spherical bearing element 54 is seated on the inner end of the setscrew 52 and the opposite end faces of the screw shaft 40 define conical recesses in which the elements 49 and 54 are seated. Further, the screw shaft 40 is provided with a thumb wheel 56 secured to the shaft 40 for rotation therewith whereby the shaft 40 may be readily rotated so as to cause each pair of support arms 20 and 22 to swing toward and away from each other thereby varying the distance between the cylindrical support members 24 by moving the latter toward and away from each other and relative to the base 12 through generally coinciding and horizontally disposed paths spaced above the base 12.

The elongated shank-type workpiece to be gauged by the gauge 10 is designated by the reference numeral 58 and is in the form of a sub-land twist drill including a generally conical tip 60 at one terminal end portion of the diametrically reduced portion 62. The base 12 may be said to define a predetermined fixed center axis disposed above the support members 24 and in an upstanding plane generally paralleling the support members 24 and spaced equally therebetween. Of course, the shank-type workpiece 58 defines a longitudinal center axis and it is believed that it will be readily apparent that the vertical height of the center axis of the workpiece may be readily positioned so as to coincide with the center axis defined by the base 12 above referred to. Further, if the gauge 10 is to gauge a cylindrical workpiece similar to the workpiece 58 but of a different diameter, the distance between the support members 24 may be readily adjusted by manipulating the thumb wheel 56 in the manner hereinbefore set forth so as to properly position the workpiece of a different diameter in a manner such that its center axis will also coincide with the center axis defined by the base 12.

With reference now more specifically to FIGURES 1, 4, 5 and 7 of the drawings, it may be seen that one end of the base 12 includes a portion defining a hollow housing designated by the reference numeral 66. The housing 66 is defined by ap air of upstanding opposite side walls 68 and 70 interconnected at opposite ends by means of a pair of end walls 72 and 74. The housing is closed at its upper end by means of a top wall 76 interconnecting the upper marginal portions of the side walls 68 and 70 and the end walls 72 and 74. In addition, the housing 66 also includes a bottom wall 78.

A pair of V-groove defining guide members 80 and 82 are supported from the bottom wall 78 in a manner which is believed obvious from FIGURE 4 of the drawings and the V-groove defining members 80 and 82 define a pair of opposing generally parallel V-grooves 84 and 86 extending transversely of the housing 66.

A pair of abutment members 88 and 90 each including oppositely opening V-grooves 92 and 94 opposing the V-grooves 84 and 86 are supported within the housing 66 with spherical bearing element 96 disposed between and seated in each pair of confronting grooves 84 and 92 and 86 and 94.

The abutment members 88 and 90 have bores 98 and 100 formed therethrough and the bore 98 has an internally threaded sleeve 102 secured therein while the bore 100 has a sleeve 104 secured therein. The sleeves 102 and 104 are oppositely internally threaded and a screw shaft 106 having oppositely threaded opposite end portions is threadedly secured through the sleeves 102 and 104 and has one end portion rotatably received through a suitable opening 108 formed in the side wall 68. The end of the screw shaft 106 projecting through the opening 108 is also provided with a thumb wheel 110 for manually rotating the shaft 106.

The abutment member 88 includes a small removable shank portion defining an abutment element and referred to be the reference numeral 112 which projects upwardly through a slot 114 formed in the top wall 76. Movement of the abutment member 88 effected by rotation of the screw shaft 106 or longitudinal shifting of the latter within the housing 66 will cause the abutment element 112 to move longitudinally of the slot 114. In addition, the abutment member 90 includes an integral upstanding portion 116 which is longitudinally slidable in the slot 114 and includes an upwardly opening blind bore 118 in which a headed pivot fastener 120 is secured by means of a setscrew 122 threadedly engaged with the portion 116, the abutment element 112 being supported from the abutment member 88 by an extension (not shown) similar to extension 116 carried by member 90 and including a bore similar to bore 118 in which the lower end of element 112 is removably secured by means of a setscrew similar to screw 122. An abutment element 124 is pivotally supported from the pivot fastener 120 and includes a substantially planar face 126. Further, the abutment element 124 has a pointer arm 128 secured thereto whose free end portion is registrable with appropriate indicia 130 formed on a quadrant plate 132 carried by the portion 116 of the abutment member 90.

Figure 2:
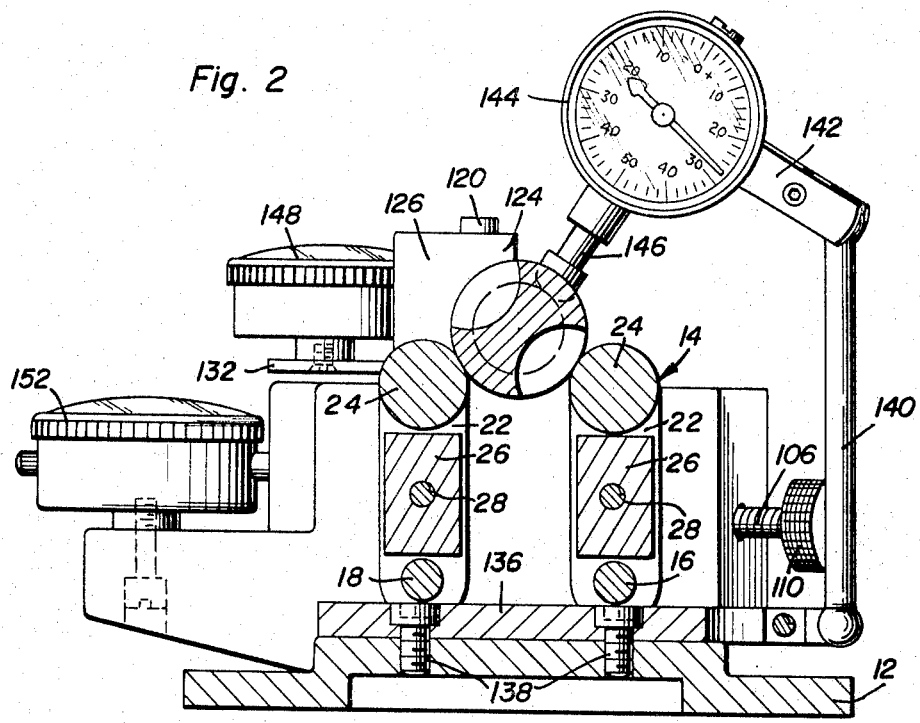
FIGURE 2 is an enlarged transverse vertical sectional view taken substantially upon the plane indicated by the section line 2—2 of FIGURE 1.
Figure 3:
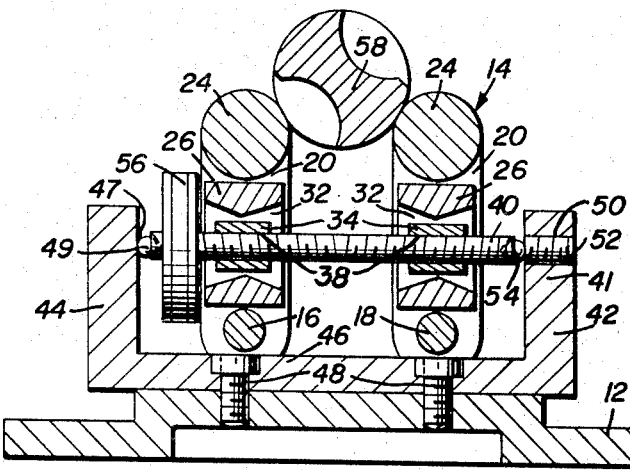
FIGURE 3 is an enlarged transverse vertical sectional view taken substantially upon the plane indicated by the section line 3—3 of FIGURE 1.

With attention now invited more specifically to FIGURE 2 of the drawings, there may be seen a support bracket 136 which is secured to the base 12 in any convenient manner such as by fasteners 138 and which universally supports one end of a first support arm 140 at one side of the base 12. The other end of the support arm 140 universally supports a first end of a second support arm 142 and the other end of the second support arm 142 has a first dial indicator 144 supported therefrom including a reciprocal shank portion 146. In addition, a second dial indicator 148 including a reciprocal shank portion 150 is supported from the quadrant plate 132 and the free end of the shank portion 150 is disposed for abutting engagement with the abutment element 124 on the side thereof remote from the planar face 126. Finally, a third dial indicator 152 is supported from the housing 66 and includes a reciprocal shank portion 154 which is abuttingly engageable with the end of the abutment member 90 remote from the abutment member 88.

In operation, the workpiece 58 to be gauged is cradled on the cylindrical support members or rollers 24 and the thumb wheel 56 may be adjusted so as to properly adjust the height of the longitudinal center axis of the workpiece 58. Then, the workpiece 58 is slid longitudinally forwardly toward the abutment element 112 so as to abuttingly engage one side of the conical tip 60 with the abutment element 112 and the surface 126. Then, the thumb wheel 110 is adjusted so as to position the abutment element 112 approximately in the center of the corresponding side of the conical tip or lip 60. At this point the second and third dial indicators 148 and 152 are set at zero reading. The pointer arm 128 at this point will indicate the degree of the lip angle or the angle of the conical tip 60. Thereafter, the workpiece 58 may be rotated 180° about its longitudinal axis and again positioned in the forwardmost position with the side of the conical tip 60 first engaged by the planar face 126 now engaging the abutment element 112. The third dial indicator will now indicate any deviation in the true center of the conical tip 60 and the reading of the dial indicator 152 will indicate the approximate amount that the drill or workpiece 58 will cut over size. The second dial indicator will of course indicate any deviation of the angle of the side of the conical tip 60 now engaged with the planar face 126. Further, the first dial indicator 144 may be engaged with the diametrically reduced portion 62 in each of the positions of rotation of the drill 58 in order to indicate any eccentric positioning of the diametrically reduced portion 62 relative to the longitudinal center axis of the drill 58. Also, the screw shaft 106 is inclined 15° relative to a plane normal to the fixed center axis defined by the base 12 and disposed in a plane paralleling the cylindrical support members 24.

As hereinbefore set forth, the third dial indicator 152 will indicate any deviation in the true center of the conical tip inasmuch as both the elements 112 and 124 are mounted for simultaneous free sliding movement along a path generally paralleling the screw 106. Further, the pointer arm 128, although utilized to give only a reasonably accurate indication of the angle of the opposite sides of the tip, would also be operative to indicate any deviation in the angles of the sides of the tip. However, the reading afforded by the pointer arm 128 would not give an indication in thousandths of an inch as to the oversize of the bore which would be cut by the drill 58. The dial indicator 152 gives a reading in thousandths of an inch of the approximate oversize bore which will be cut by the drill 58 and the indicator 148 will indicate slight variations in the angles of the sides of the conical tip. Accordingly, while the pointer arm 128 could be utilized to indicate deviations in the angles of the sides, it is primarily used to give a reasonably accurate indication of the angle of the sides and the indicator 148 is utilized to give an extremely accurate indication of any deviation in the angle of the sides of the tip.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention.

What is claimed as new is as follows:

1. A gauge including a base, first means supported from said base and adapted to support an elongated shank-type workpiece and defining a longitudinal center axis along which said workpiece is adapted to extend, a pair of abutment members, means mounting said abutment members on said base on opposite sides of said axis for movement in unison along a path extending transversely of said center axis and relative adjustable movement along said path toward and away from each other, second means operative to indicate movement of a first of said abutment members along said path, one of said abutment members having a workpiece engaging element pivotally supported therefrom for rotation about an axis disposed generally normal to a plane paralleling said center axis and said path, and third means operative to indicate pivotal movement of said element relative to said one abutment member, said work engaging element including a planar work engaging surface generally paralleling the axis of rotation of said work engaging element relative to said one abutment member, said planar work engaging surface extending on both sides of a plane disposed normal to said surface and containing the last-mentioned axis.

2. The combination of claim 1 wherein said second means is carried by said base.

3. The combination of claim 1 wherein said third means includes first and second coacting portions, respectively, carried by said element and said one abutment member.

4. The combination of claim 1 wherein said first means includes means operative to cradle said shank-type workpiece from opposite sides thereof and to position the center axes of workpieces of different diameters so as to substantially coincide with the first mentioned center axis.

5. The combination of claim 4 wherein said support members are generally cylindrical in shape.

6. The combination of claim 4 wherein said assembly also includes means rotatably supporting said support members for rotation about their longitudinal axes.

7. The combination of claim 1 wherein said cradle means includes a pair of elongated members disposed on opposite sides of and generally paralleling said center axis and supported from said base for simultaneous inverse and equal lateral movement toward and away from said center axis, said elongated members including support surfaces facing in upwardly convergent directions, said support surfaces being generally partially cylindrical in configuration and outwardly convexed.

8. The combination of claim 1 wherein said path is inclined approximately 15 degrees relative to a line disposed at right angles relative to said center axis.

9. A gauge including a base, first means supported from said base and adapted to support an elongated shank-type workpiece and defining a longitudinal center axis along which said workpiece is adapted to extend, a pair of abutment members, means mounting said abutment members on said base on opposite sides of said axis for movement in unison along a path extending transversely of said center axis and relative adjustable movement along said path toward and away from each other, second means operative to indicate movement of a first of said abutment members having a workpiece engaging element pivotally supported therefrom for rotation about an axis disposed generally normal to a plane paralleling said center axis and said path, and third means operative to indicate pivotal movement of said element relative to said one abutment member, said first means including means operative to cradle said shank-type workpiece from opposite sides thereof and to position the center axes of workpieces of different diameters so as to substantially coincide with the first mentioned center axis, said cradle means including a pair of elongated members disposed on opposite sides of and generally paralleling said center axis and supported from said base for simultaneous inverse and equal lateral movement toward and away from said center axis, said elongated members including support surfaces facing in upwardly convergent directions.

10. The combination of claim 6 wherein said elongated members comprise cylindrical members rotatably supported from said base for rotation about their longitudinal axes.

References Cited

UNITED STATES PATENTS

| | | | |
|---|---|---|---|
| 2,608,767 | 9/1952 | Hall | 33—201 |
| 2,840,921 | 7/1958 | Swanson | 33—201 |
| 3,184,860 | 5/1965 | Garrison | 33—201 |
| 2,566,356 | 9/1951 | Niper | 33—199 |
| 2,284,257 | 5/1942 | Gergstrom | 51—236 |
| 2,030,237 | 2/1936 | Brittain et al. | 33—174 |
| 1,274,554 | 8/1918 | Ives | 254—104 |

FOREIGN PATENTS

| | | |
|---|---|---|
| 484,126 | 5/1938 | Great Britain. |

LEONARD FORMAN, *Primary Examiner.*

R. A. FIELDS, *Assistant Examiner.*